United States Patent [19]
Sova

[11] 3,982,479
[45] Sept. 28, 1976

[54] ENERGY SAVING COOKING UTENSIL

[76] Inventor: Jacob W. Sova, 450 Victory Way, Wyckoff, N.J. 07481

[22] Filed: May 2, 1975

[21] Appl. No.: 574,114

[52] U.S. Cl. .............................. 99/447; 126/376; 220/367
[51] Int. Cl.² ........................................ A47J 27/00
[58] Field of Search ............ 99/447, 324, 339, 389, 99/401, 425, 433, 446, 447; 126/376, 390–391; 220/206, 246, 253, 367

[56] References Cited
UNITED STATES PATENTS

| | | | |
|---|---|---|---|
| 269,313 | 12/1882 | Ogborn | 126/391 X |
| 506,849 | 10/1893 | Hailes | 126/376 |
| 517,673 | 4/1894 | Tracy | 126/376 |
| 926,163 | 6/1909 | Bauer | 220/367 X |
| 1,193,954 | 8/1916 | Walden | 220/367 X |
| 1,698,225 | 1/1929 | Dick | 126/376 |
| 1,710,971 | 4/1929 | Dick | 126/376 |
| 3,785,274 | 1/1974 | Yamamoto | 99/425 |

FOREIGN PATENTS OR APPLICATIONS

| | | | |
|---|---|---|---|
| 537,638 | 11/1931 | Germany | 99/447 |
| 132,563 | 7/1929 | Switzerland | 99/447 |
| 364,878 | 11/1962 | Switzerland | 99/447 |
| 999,165 | 12/1963 | United Kingdom | 99/447 |

*Primary Examiner*—Peter Feldman
*Assistant Examiner*—Arthur O. Henderson
*Attorney, Agent, or Firm*—James J. Cannon, Jr.; James J. Cannon

[57] ABSTRACT

A cooking utensil having an outer flange with inward or outward flaring lower base perimeter rim which covers the entire heating element of a stove and recirculates heat which would otherwise escape around the bottom of the cooking utensil. Alternate embodiments utilize the flange as a supporting member, provided for ease of cleaning and provide covers for existing cooking utensils.

3 Claims, 10 Drawing Figures

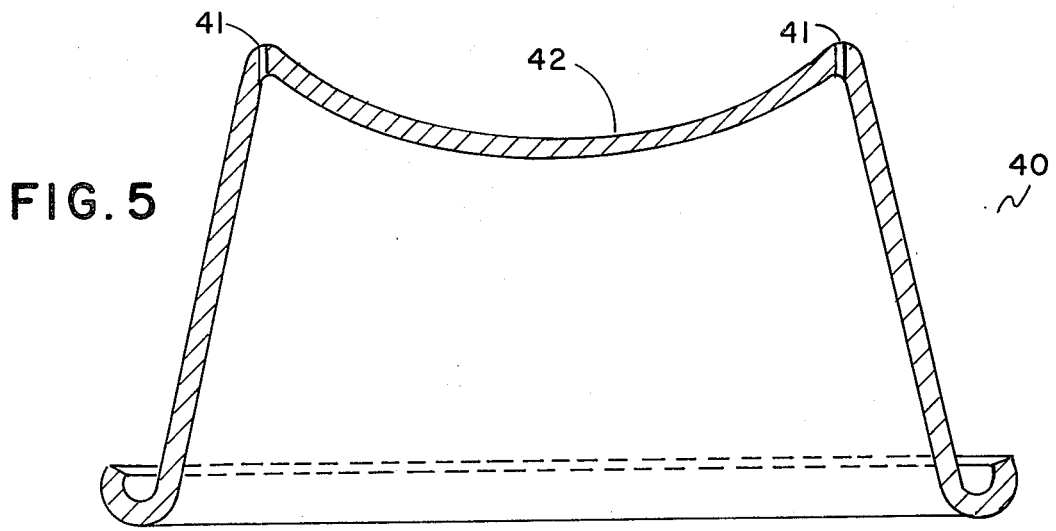
FIG. 5
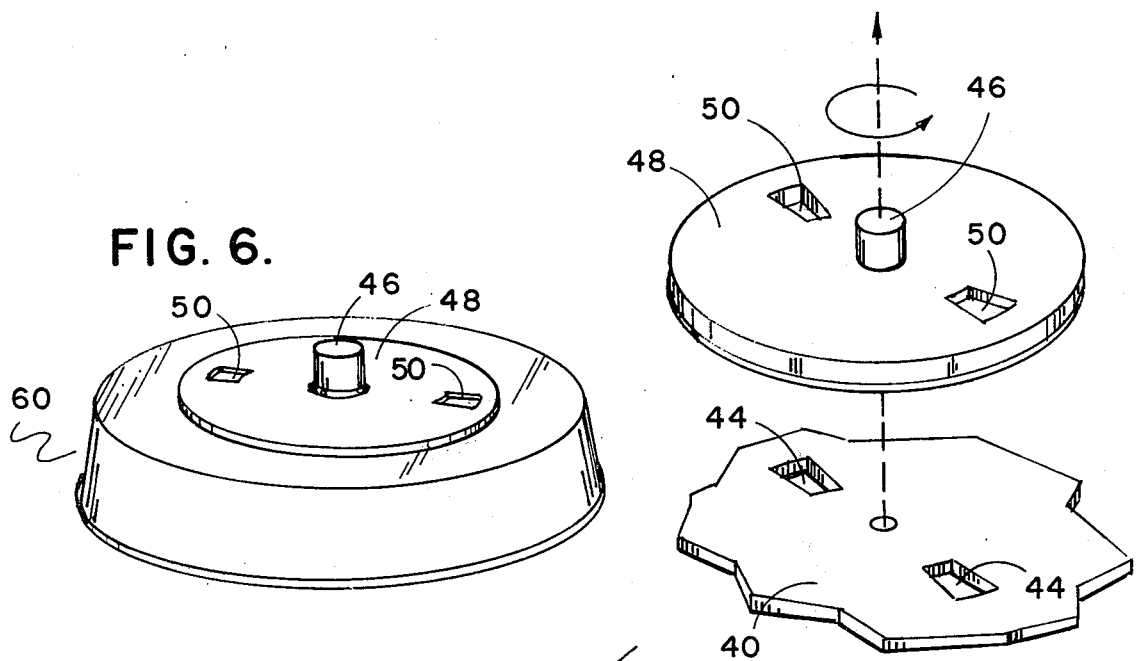
FIG. 6.
FIG. 7
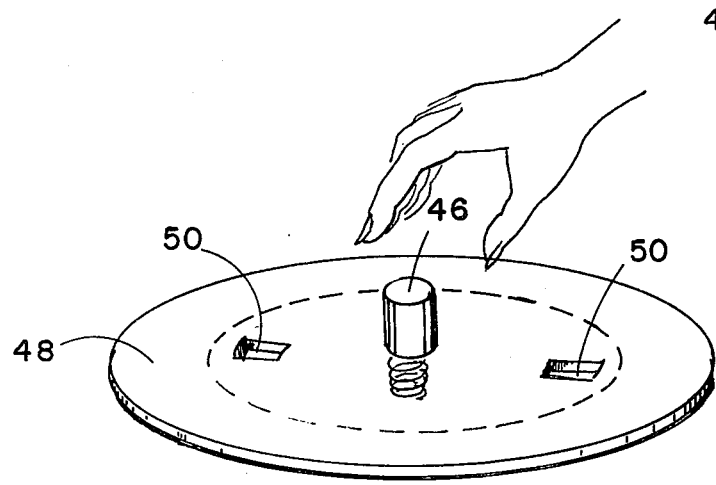
FIG. 8

3,982,479

ENERGY SAVING COOKING UTENSIL

BACKGROUND OF THE INVENTION

1. Field of the Invention:

The present invention pertains to cooking utensils which serve as vessels for heating solids and liquids and have means to accumulate and recirculate heat about the sides of the vessel as well as underneath it.

2. Description of the Prior Art:

The prior art is replete with innovative designs for cookware. The prior art closest to the disclosure herein is primarily in the field of steam-type cooking utensils and deep-fry type cooking utensils.

In particular, Anderson, U.S. Pat. No. 2,154,391 discloses a deep fat frier which provides a cold spot by encasing a kettle within a housing. Lewis, U.S. Pat. No. 861,297, discloses a roasting pan with an outer supporting flange to raise the bottom of the pan off the source of heat. Anetsberger, U.S. Pat. No. 2,061,533 discloses a deep fat frier enclosed in a housing.

Nielsen, U.S. Pat. No. 2,431,193, discloses a kettle enclosed within a larger housing to trap heat around the sides of the kettle.

The basic problem with the prior art devices disclosed above and others similar to them is that they are primarily special purpose cooking utensils and their specific design and construction is limited by the application which they serve. The present disclosure pertains to a general purpose cooking utensil which is designed to capture and recirculate most of the heat radiated by a heating element and utilize that heat to cook more efficiently. The design permits variations to achieve some of the special purpose features of prior art devices and also permits easy cleaning in dishwashing machines.

SUMMARY OF THE INVENTION

This invention pertains to general purpose cooking utensils, variously referred to as pots and pans, and specifically pertains to a structure for cooking utensils which covers the entire source of heat such as a stove top burner to trap the heat which would normally escape around the sides of the cooking utensil. The novel structure comprises an outer flange integrally formed with the upper rim of the pan and flaring outwardly and downwardly to form effectively an outer wall around the cooking utensil. The base rim of the outer flange may be curved outwardly to catch drippings or inwardly to serve as a means for recirculating heat around the inner wall of the cooking utensil. The outer flange may be extended below the level of the bottom of the cooking utensil in which case it would serve as a supporting member to keep the bottom of the cooking utensil off the source of heat. Likewise, in certain applications, it may be raised slightly to permit small amounts of heat to escape. The base rim of the outer flange may also be curved inwardly to recirculate heat in the space between the outer flange and the inner wall of the cooking utensil. The shape of the outer flange may be corrugated to provide a larger heating surface and to deflect heat inward toward the cooking utensil. A cover may be provided which permits the escape of steam within the cooking utensil.

A convenient alternative embodiment is described in which a cover for existing cooking utensils has an integrally formed and downwardly extending flange similar to that of the cooking utensil described above. This cover may be utilized with existing cooking utensils, but obviously cannot serve as a support member.

BRIEF DESCRIPTION OF THE DRAWINGS

FIG. 5 illustrates an alternate embodiment of the cover of FIGS. 3, 4, and 4a.

FIG. 6 illustrates a cover for the cooking utensil of FIG. 1.

FIGS. 7 and 8 illustrate a cover steam ventilation system adaptable to the covers of FIGS. 3 and 5.

DESCRIPTION OF THE PREFERRED EMBODIMENT

Figure 1:
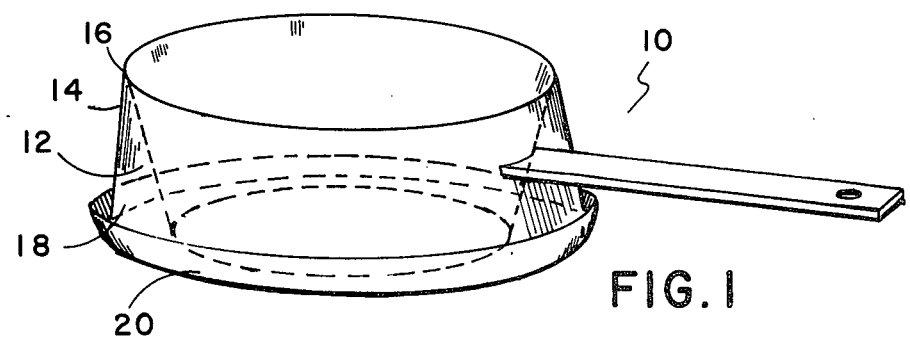
FIG. 1 is a side perspective view of a cooking utensil embodying the principles of the present invention.

Referring now to the drawings, and in particular to FIG. 1, wherein is shown a side perspective view of the preferred embodiment of the present invention, the reference numeral 10 refers generally to an energy saving cooking utensil having an inner member 12 in which foods are cooked, and integrally formed therewith an outwardly and downwardly extending outer flange 14 which connects to inner member 12 at its upper rim 16 and is integrally formed therewith.

Figures 2, 2A:
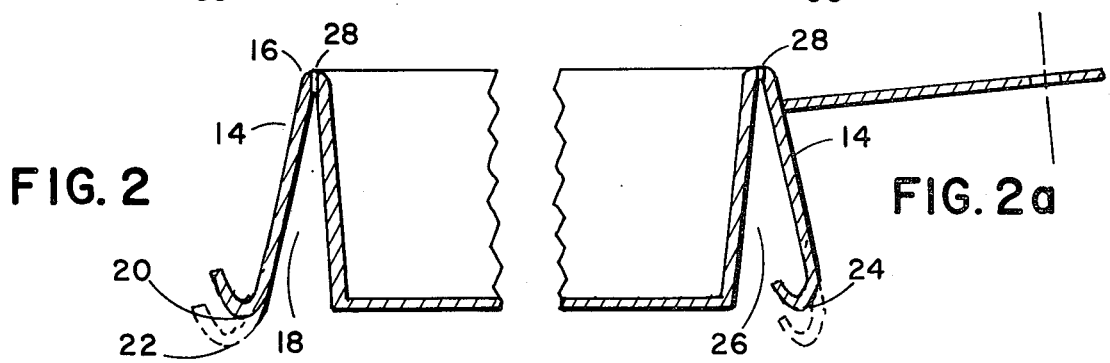
FIGS. 2 and 2a are vertical sectional views of the embodiment shown in FIG. 1 illustrating both the preferred embodiment and an alternate embodiment of the base of the flange.

Inner member 12 is basically a standard cooking utensil designed to be placed over a heating unit of a standard stove or range. Regardless of the size of the heating unit or the size of the cooking utensil, some heat will escape outwards around the perimeter of the cooking utensil. Outer flange 14 is designed to extend downwardly and outwardly from the upper rim 16 of inner member 12 to the upper surface of a stove beyond the perimeter of the heating unit such that it will rest flush with said surface and trap and retain the escaping heat within the heat circulating passage 18. The base rim 20 of outer flange 14 is curved outwardly and upwardly, as shown in FIGS. 1 and 2. Outer flange 14 may be extended below the base of cooking utensil 10 such that its base rim 22 is also below the level of the base of inner member 12. In this embodiment outer flange 14 can serve as a support member to keep the base of inner member 12 off the source of heat. It could also compensate for stove burners which are substantially raised above the tops of the stoves. With the base rims 20, or 22, curved outwardly and upwardly, as in FIGS. 1 and 2, base rims 20 or 22 can also serve to catch drippings.

An alternate configuration, shown in FIG. 2a in vertical section, provides a base rim 24 curved inwardly and upwardly. When base rim 24 is flush with the top surface of a stove, it provides a means for recirculating heat within heat circulating passage 26. The height of base rim 24 may be varied relative to the base of inner member 12 to provide for varying heating elements on stoves, and also to permit some escape of steam.

In either configuration shown in FIGS. 2 and 2a, small openings 28 may be provided in the upper rim of cooking utensil 10 to provide for drainage of water when cooking utensil 10 is placed in an inverted position in a dishwashing machine.

FIG. 7 illustrates a steam ventilation design for a cover for cooking utensil 10 which is described in detail infra.

Figure 3:
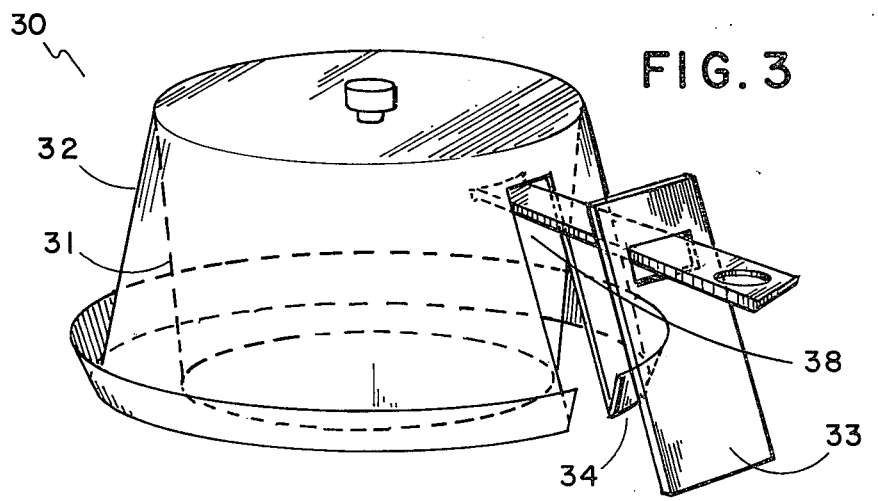
FIG. 3 is a side perspective view showing a cover for a cooking utensil embodying the principles of the present invention.
Figures 4, 4A:
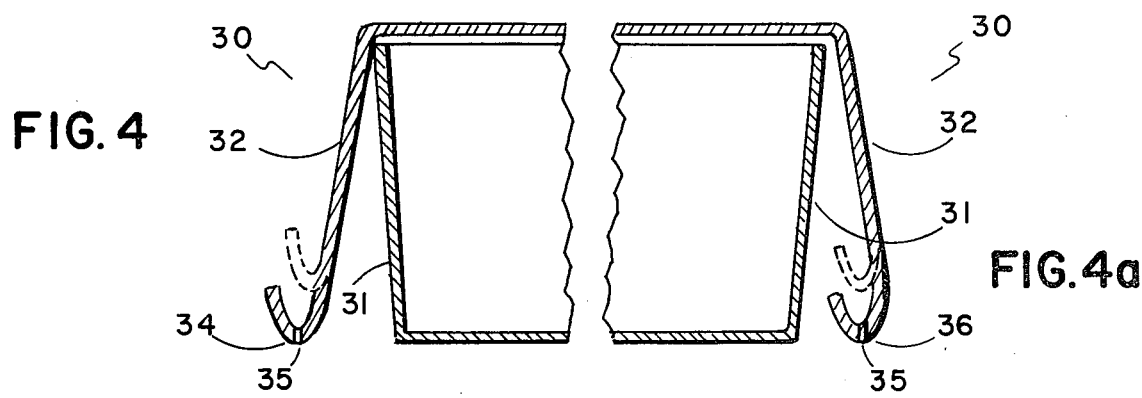
FIGS. 4 and 4a are vertical sectional views of the cover shown in FIG. 3, illustrating alternate embodiments of the base of the flange.

FIGS. 3, 4 and 4a illustrate an alternate embodiment of the present invention wherein a cover 30 is provided for existing cooking utensils 31 with the same energy saving features as described for cooking utensil 10 supra. Cover 30 has integrally formed therewith a downwardly and outwardly extending flange 32 and a base rim 34 which curves upwardly and outwardly or a base 36 which curves upwardly and inwardly. Cover 30, because it is not integrally formed with cooking utensil 31, cannot serve as a support member to raise cooking utensil 31 from direct contact with the heating element of a stove. Cover 30 also requires an opening 38 to allow for the handles of existing cooking utensils 31. A separate member may be attached to the cover 30 or slipped on the handle of utensil 31 to partially enclose opening 38 to reduce the escaping heat to a minimum. Cover 30 may be provided with drainage openings 35 in its base rim 34 or base rim 36.

FIG. 5 illustrates an alternate embodiment of the cover 30 of FIG. 3. In FIG. 5 cover 40 has a concave upper surface 42 with a bevelled outer perimeter to permit a tight fit on cooking utensils of varying diameters. Cover 40 also has apertures 41 therein which serve as steam escape vents. A knob 46 is rotatably attached to said cover 40 and a small plate 48 of cover material is fixably attached to said knob. Plate 48 has apertures 50 identical in size to the apertures 44 of cover 40. Plate 48 is rotated by turning knob 46. When apertures 50 of plate 48 are over apertures 44 of cover 40, the maximum amount of steam can escape. Small turns of knob 46 will reduce the amount of steam escaping and a full one-quarter turn will make the apertures 44, 50 non-coincident and eliminate the escape of steam. Alternate embodiments of this steam ventilation apparatus will be readily apparent to those skilled in the art. This same steam ventilation apparatus may be utilized with cover 30 described supra, and with cover 60, illustrated in FIG. 6, which may be utilized with cooking utensil 10.

An alternate embodiment of the steam ventilation knob is shown in FIG. 8. In this configuration plate 62 is placed under the upper surface cover 64 and held in position by a spring loaded knob 66 having a short shaft 67. When knob 66 is depressed, plate 62 is lowered for cleaning. This embodiment may be utilized on covers 30 and 60 also. Plate 62 also has steam ventilation apertures 68.

Cooking utensil 10, by trapping heat around the sides of inner member 12, which is equivalent to a standard cooking utensil, enables food to be cooked more quickly and the food to stay warmer for a longer period of time after the heating element is turned off. It also provides a more uniform heat to the food in the cooking utensil 10 since heat is applied from the sides as well as from the bottom. The retention circulation of heat in heat circulation passage 18 causes the heat to spread evenly and quickly around inner member 12 in which food is cooked. This will cause a faster and more even cooking of the food and tend to minimize the development of hot spots. The retention of heat after the heating unit is turned off keeps the cooked food warmer for longer periods of time. Exhaust features can be utilized to regulate the escape of steam. The next effect is a savings of energy in cooking and less dissipation of wasted heat into the kitchen. Covers 30 and 40 provide many of the advantages described for cooking utensil 10.

I claim:
1. An energy saving cooking utensil comprising:
   an inner member having the shape and dimensions of a standard stove-top cooking utensil including a base, side perimeter walls and an upper perimeter rim;
   an outer flange extending outwardly and downwardly from the upper perimeter rim of said inner member and integrally formed with said upper perimeter rim;
   said outer flange having a base rim which extends beyond the circumferential perimeters of said inner member and of a heating unit of a stove;
   said outer flange and said side perimeter walls defining a heat circulation passage about the perimeter of said inner member;
   a plurality of spaced apart apertures along the top of said upper perimeter rim to permit drainage during washing;
2. The energy saving cooking utensil of claim 1 further including a cover having means for regulating the escape of steam from said cooking utensil comprising:
   a cover to fit over the upper perimeter rim and upper flange rim of said cooking utensil;
   at least two spaced apart apertures in said cover;
   a spring loaded shaft having a turning knob on the upper end thereof rotatably secured to said cover at the center thereof;
   a plate conforming in shape to said cover fixably secured to said shaft having two spaced apart apertures of the same size and shape as said apertures of said cover;
   said apertures in said plate being positioned such that upon the rotation of said plate and shaft they may be moved from a location coincident with said apertures in said cover to permit a maximum amount of steam to escape from said cooking utensil to a location such that said apertures in said plate will coincide with solid sections of said cover to prevent steam from escaping from said cooking utensil;
   said shaft being spring loaded to permit the separation of said plate from said cover for ease of rotation and for cleaning and to hold said plate securely against said cover when no pressure is applied to said spring loaded shaft.
3. An energy saving cover for standard cooking utensils comprising:
   an upper surface having the shape and dimensions of a standard cooking utensil;
   an outer flange extending outwardly and downwardly from the perimeter of said upper surface and integrally formed therewith;
   said outer flange having a base rim which extends beyond the circumferential perimeters of the cooking utensil and of the heating unit of a stove;
   said outer flange of said cover combining with the perimeter sides of said cooking utensil to form and define a heat circulation passage;
   said upper surface of said cover being concave to provide an air tight fit on cooking utensils of varying sizes;
   at least two spaced apart apertures in said cover;

a spring loaded shaft having a turning knob on the upper end thereof rotatably secured to said cover at the center thereof;

a plate conforming in shape to said cover fixably secured to said shaft having two spaced apertures of the same size and shape as said apertures of said cover;

said apertures in said plate being positioned such that upon the rotation of said plate and shaft, they may be moved from a location coincident with said apertures in said cover to permit a maximum amount of steam to escape from said cover to a location such that said apertures in said plate will coincide with solid sections of said cover to prevent steam from escaping through said covers;

said shaft being spring-loaded to permit the separation of said plate from said cover for ease of cleaning and for ease of rotation, and also to secure said plate tightly against said cover when no pressure is applied to said spring-loaded shaft.

* * * * *